(12) United States Patent
Stern

(10) Patent No.: US 8,443,585 B2
(45) Date of Patent: *May 21, 2013

(54) THRUST REVERSING VARIABLE AREA NOZZLE

(75) Inventor: Alfred M. Stern, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,264

(22) Filed: Aug. 1, 2011

(65) Prior Publication Data

US 2011/0289900 A1 Dec. 1, 2011

Related U.S. Application Data

(63) Continuation of application No. 11/872,143, filed on Oct. 15, 2007, now Pat. No. 8,006,479.

(51) Int. Cl.
*F02K 3/02* (2006.01)

(52) U.S. Cl.
USPC .......................... 60/226.2; 60/230

(58) Field of Classification Search
USPC .............. 60/226.2, 226.3, 230; 239/265.23, 239/265.25, 265.27, 265.29, 265.31; 244/110 B
See application file for complete search history.

(56) References Cited

U.S. PATENT DOCUMENTS

| 3,262,268 A | 7/1966 | Beavers |
| 3,829,020 A | 8/1974 | Stearns |
| 4,185,798 A | 1/1980 | Dickenson |
| 4,373,328 A | 2/1983 | Jones |
| 4,527,391 A | 7/1985 | Marx |
| 4,564,160 A | 1/1986 | Vermilye |
| 4,716,724 A | 1/1988 | Newton |
| 4,802,629 A | 2/1989 | Klees |
| 5,313,788 A | 5/1994 | Wright et al. |
| 5,575,147 A * | 11/1996 | Nikkanen ............... 60/226.2 |
| 5,655,360 A | 8/1997 | Butler |
| 5,778,659 A | 7/1998 | Duesler et al. |
| 5,806,302 A | 9/1998 | Cariola |
| 5,974,783 A * | 11/1999 | Gonidec et al. ............ 60/226.2 |
| 6,000,216 A * | 12/1999 | Vauchel ................. 60/226.2 |
| 6,385,964 B2 | 5/2002 | Jean |
| 6,546,715 B1 | 4/2003 | Blevins |
| 6,625,972 B1 * | 9/2003 | Sternberger ............. 60/226.2 |
| 7,093,793 B2 | 8/2006 | Lair |

FOREIGN PATENT DOCUMENTS

| EP | 0779429 A2 | 6/1997 |
| EP | 0884470 A1 | 12/1998 |
| FR | 2184021 | 12/1973 |
| FR | 2903454 | 1/2008 |
| WO | 83/03281 | 9/1983 |
| WO | 9634193 | 10/1996 |

OTHER PUBLICATIONS

Extended European Search Report dated Dec. 21, 2011 for EP Application No. 08253283.9.

* cited by examiner

*Primary Examiner* — Phutthiwat Wongwian
(74) *Attorney, Agent, or Firm* — Carlson, Gaskey & Olds, P.C.

(57) ABSTRACT

A gas turbine engine system includes a first nozzle section associated with a gas turbine engine bypass passage and a second nozzle section that includes a plurality of positions relative to the first nozzle section. In at least one of the positions, there is a gap between the first nozzle section and the second nozzle section. A movable door between the first nozzle section and the second nozzle section selectively opens or closes the gap.

28 Claims, 2 Drawing Sheets

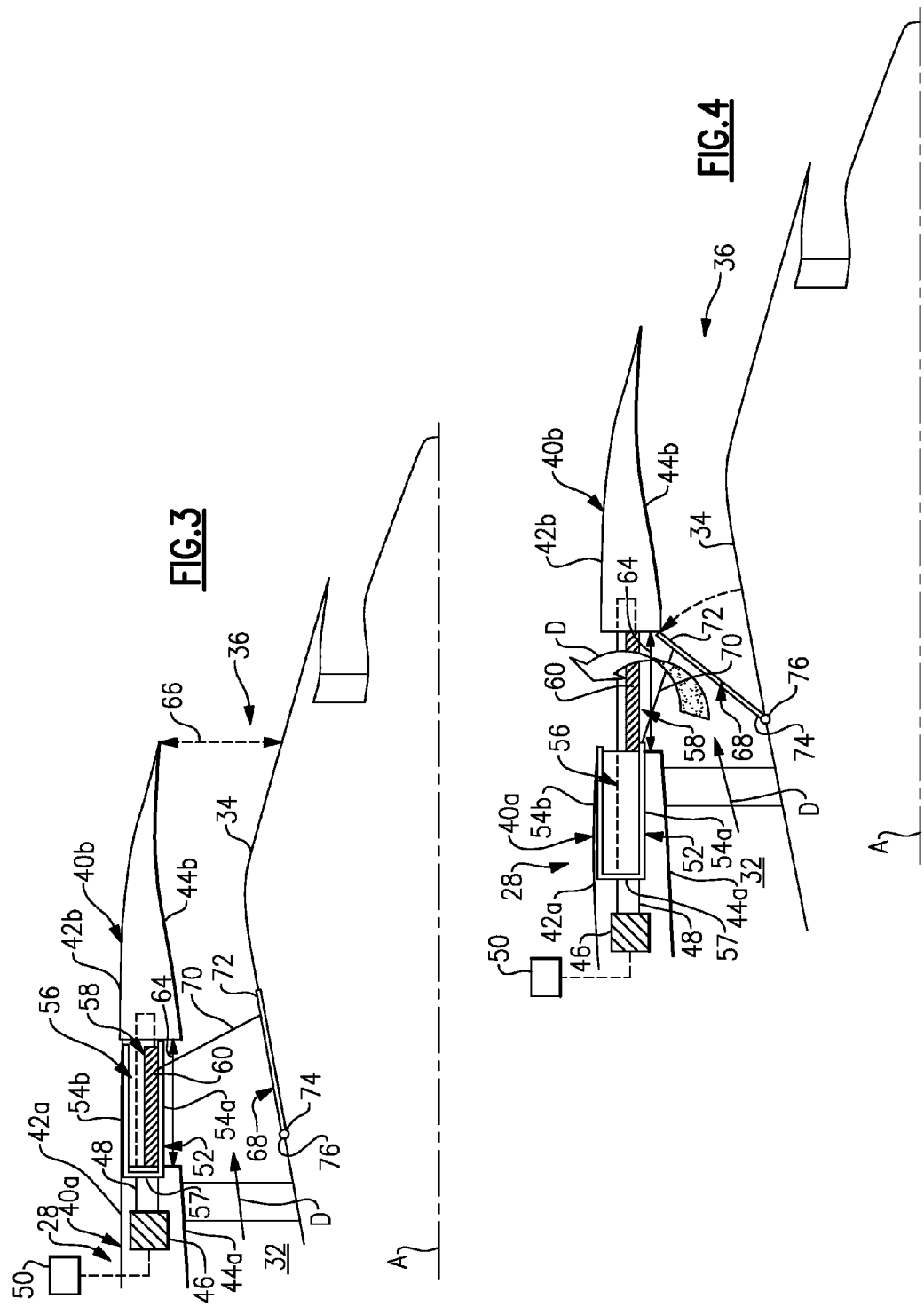

THRUST REVERSING VARIABLE AREA NOZZLE

CROSS REFERENCE TO RELATED APPLICATIONS

This application is a continuation of U.S. application Ser. No. 11/872,143 filed on Oct. 15, 2007 now U.S. Pat. No. 8,006,479.

BACKGROUND OF THE INVENTION

This disclosure relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. One type of conventional gas turbine engine includes a compression section, a combustion section, and a turbine section that utilize a primary airflow into the engine to generate power or propel the vehicle. The gas turbine engine may be mounted within a housing, such as a nacelle, depending on the vehicle design. A bypass airflow flows through a passage between the housing and the engine and exits from the engine at an outlet.

Presently, conventional thrust reversers are used to generate a reverse thrust force to slow forward movement of a vehicle, such as an aircraft. Although effective, conventional thrust reversers serve only for thrust reversal and, when in a stowed position for non-landing conditions, do not provide additional functionality. Accordingly, there is a need for a thrust reverser having additional functionality.

SUMMARY OF THE INVENTION

An example gas turbine engine system includes a first nozzle section associated with a gas turbine engine bypass passage and a second nozzle section having a plurality of positions relative to the first nozzle section. In at least one of the positions, there is a gap between the first nozzle section and the second nozzle section. A movable door is located at least partially between the first nozzle section and the second nozzle section for selectively opening or closing the gap.

In one example, the gas turbine engine system also includes a fan, a combustion section downstream of the fan, a turbine section downstream of the combustion section, and the fan bypass passage is downstream from the fan.

An example method of controlling the gas turbine engine system includes selectively moving the second nozzle section relative to the first nozzle section to establish a desired axial bypass flow through the nozzle and establish a gap between the first nozzle section and the second nozzle section. A door located at least partially between the first nozzle section and the second nozzle section may be selectively moved to open or close the gap.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3 illustrates selected portions of the nozzle in a second position.

FIG. 4 illustrates selected portions of the nozzle in a third position.

DETAILED DESCRIPTION OF THE PREFERRED EMBODIMENT

Figure 1:
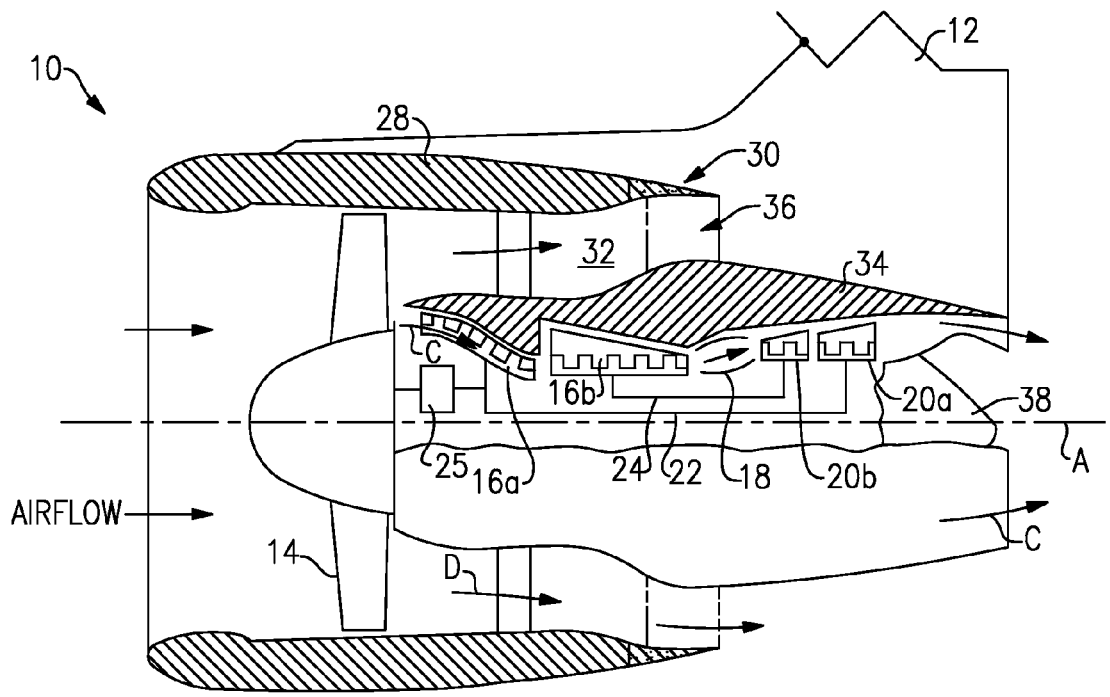
FIG. 1 illustrated selected portions of an example gas turbine engine system having a nozzle that integrated the variable area of control and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22 and 24 (e.g., spools) to rotationally drive the compressors 16a, 16b and the fan 14 in response to the expansion. In this example, the rotor 22 also drives the fan 14 through a gear train 25.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 25 is an epicycle gear train, for example, a star gear train, providing a gear reduction ratio of greater than 2.5. It should be understood, however, that the above parameters are only exemplary of a contemplated geared architecture engine. That is, the disclosed examples are applicable to other engines.

An outer housing, nacelle 28, (also commonly referred to as a fan nacelle) extends circumferentially about the fan 14. A fan bypass passage 32 extends between the nacelle 28 and an inner housing, inner cowl 34, which generally surrounds the compressors 16a, 16b and turbines 20a, 20b. In this example, the gas turbine engine 10 includes a nozzle 30 that is coupled with the nacelle 28. The nozzle 30 integrates functions of a variable fan nozzle and a thrust reverser, as will be described below.

In operation, the fan 14 draws air into the gas turbine engine 10 as a core flow, C, and into the bypass passage 32 as a bypass air flow, D. The bypass air flow D is discharged axially as a discharge flow through a rear exhaust 36 associated with the nozzle 30 near the rear of the nacelle 28 in this example. The core flow C is discharged from a passage between the inner cowl 34 and a tail cone 38.

For the gas turbine engine 10 shown FIG. 1, a significant amount of thrust may be provided by the discharge flow D due to the high bypass ratio. Thrust is a function of density, velocity, and area. One or more of these parameters can be manipulated to vary the amount and direction of thrust provided or to enhance conditions for aircraft control, operation of the fan 14, operation of other components associated with the bypass passage 32, or operation of the gas turbine engine 10. For example, an effective change in a cross-sectional area of the rear exhaust 36 causes an air pressure change within the bypass passage 32 that in turn changes a pressure ratio across the fan 14. Thus, different cross-sectional areas may be desired for different flight conditions, such as aircraft cruise and take-off.

In the disclosed example, the nozzle 30 may be used to control the cross-sectional area of the rear exhaust 36. However, it should be understood that the bypass flow or discharge flow D may be effectively altered through other features, for example, by altering a flow boundary layer. Furthermore, it should be understood that effectively altering the cross-sectional area of the rear exhaust 36 is not limited to physical locations approximate to the exit of the nacelle 28, but rather, includes altering the bypass flow D by any suitable means at any suitable location along the length of the engine 10.

Figure 2:
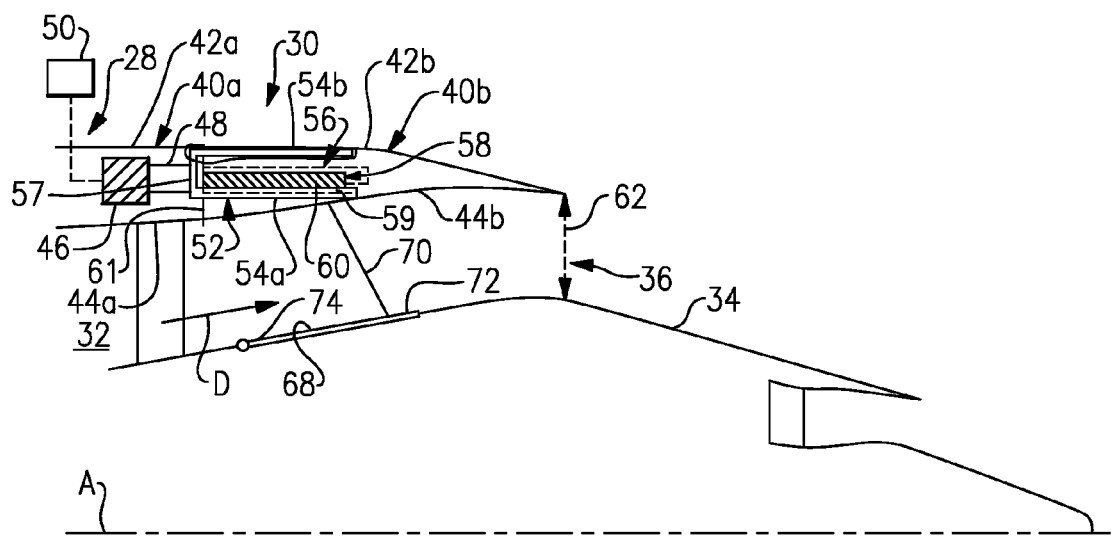
FIG. 2 illustrates selected portions of the nozzle in a first position.

Referring to FIG. 2, the nozzle 30 in this example includes a first nozzle section 40a and a second nozzle section 40b that is axially aft of the first nozzle section 40a. The first nozzle section 40a is an aft end of the nacelle 28; however, the first nozzle section 40a may alternatively be a separate piece that is coupled to the nacelle 28. The first nozzle section 40a and the second nozzle section 40b include respective outer surfaces 42a and 42b and respective inner surfaces 44a and 44b relative to the engine centerline A.

In this example, the second nozzle section 40b is axially translatable relative to the first nozzle section 40a using an actuator 46. The actuator is connected with the second nozzle section 40b through a linkage 48, which may include any suitable type of linkage such as, but not limited to, a telescopic linkage.

It is to be understood that the nozzle 30 may include a plurality of the second nozzle sections 40b arranged circumferentially around the bypass passage 32. In this regard, the first nozzle section 40a and the second nozzle section 40b at least partially form an outer surface of the bypass passage 32, while the nacelle 28 forms the axially forward portion of the bypass passage 32 and the inner cowl 34 forms an inner surface of the bypass passage 32. Depending upon the number of second nozzle sections 40b that are used, a corresponding number of the actuators 46 may be used to selectively move the second nozzle sections 40b. The actuators 46 are in communication with a controller 50 to selectively axially translate the second nozzle sections 40b. The controller 50 may be dedicated to controlling the nozzle 30, integrated into an existing engine controller within the gas turbine engine 10, or be incorporated with other known aircraft or engine controls. Additionally, the controller 50 and the actuators 46 may be mounted in other locations than shown in this example.

A movable door 52 is at least partially between the first nozzle section 40a and the second nozzle section 40b. The movable door 52 includes an inner surface 54a and an outer surface 54b that is spaced apart from the inner surface 54a to form a pocket 56 therebetween. A side 57 connects the inner surface 54a and the outer surface 54b. In the disclosed example, the outer surface 54b of the moveable door 52 is approximately flush with the outer surface 42a of the first nozzle section 40a and the outer surface 42b of the second nozzle section 40b to maintain an aerodynamic profile of the engine 10, as will be discussed below.

The moveable door 52 is also connected with the actuator 46 through the linkage 48, which may include multiple telescopic links. In this regard, the actuator 46 is a dual mode actuator that can move the second nozzle section 40b and the movable door 52 independently of each other. Alternatively, a separate actuator may be used to independently move the movable door 52.

A thrust reverse cascade 58 is received at least partially within the pocket 56. The thrust reverse cascade 58 includes vents 60 (shown schematically) for achieving a thrust reversing effect, such as by changing a direction of the discharge flow D. The thrust reverse cascade may also include guides, such as tracks 59, shown schematically, for guiding and supporting the moveable door 52 and linkage 48.

In operation, the controller 50 selectively commands the actuator 46 to move the second nozzle section 40b between a first position (FIG. 2) and a second position (FIG. 3) to thereby control a nozzle cross-sectional flow area 62. The second nozzle section 40b may also be moved to intermediate positions between the positions shown. It is to be understood that the controller 50 may command multiple actuators 46 to move multiple second nozzle sections 40b in concert, or independently if desired. In the first position as shown in FIG. 2, the second nozzle section 40b is axially forward and is received against the first nozzle section 40a. A seal 61 may be provided between the first nozzle section 40a and the second nozzle section 40b to prevent the discharge flow D from leaking therebetween.

The controller 50 selectively commands the actuator 46 to translate the second nozzle section 40b axially rearward relative to the first nozzle section 40a to the second position as illustrated in FIG. 3. In the second position, there is a gap 64 (represented by a dashed arrow) between the first nozzle section 40a and the second nozzle section 40b. As will be described more fully below, the moveable door 52 is operative to selectively open or close the gap 64.

Movement of the second nozzle section 40b axially rearward increases the nozzle cross-sectional flow area 62 to nozzle cross-sectional flow area 66. In the illustrated examples, the nozzle cross-sectional flow area corresponds to a distance between the aft end of the second nozzle section 40b and the inner cowl 34. However, given this description, one of ordinary skill in the art will recognize that the nozzle area may be defined at other locations or using other components.

The increased nozzle cross-sectional flow area 66 provides additional axial area for exit of the discharge flow D from the bypass passage 32 to thereby alter a pressure in the bypass passage 32. For example, the second nozzle section 40b may be moved between the positions shown in FIGS. 2 and 3 based on flight conditions, such as in response to cruise or take-off, for example. Thus, the nozzle 30 functions to provide variable area capability.

The moveable door 52 also maintains an aerodynamic profile of the engine 10 during operation of the second nozzle section 40b to control the nozzle cross-sectional area. For example, the outer surface 54b of the moveable door 52 is approximately flush with the outer surfaces 42a and 42b. That is, the outer surface 54b is slightly radially inwards of the outer surfaces 42a and 42b to permit the moveable door 52 to fit within the interiors of the nozzle sections 40a and 40b but is not offset so much as to cause a large aerodynamic disturbance of airflow over the nacelle 28 and nozzle 30. In some examples, the outer surface 54b may contact the inner sides of the walls forming the outer surfaces 42a and 42b. In other examples, the outer surface 54a may be spaced a few millimeters or even a few centimeters from the walls forming the outer surfaces 42a and 42b, depending on how much of an aerodynamic disturbance is tolerable.

In the illustrated example, the nozzle 30 also functions as a thrust reverser. A thrust reverse blocker door 68 is connected for movement with the moveable door 52 through a linkage 70. For example, the linkage 70 may be connected with the movable door 52 using a pin connection or other suitable type of connection. In this example, the thrust reverse blocker door 68 includes a free end 72 and a fixed end 74 that is connected with a pivot 76.

The controller 50 selectively commands the actuator 46 to move the movable door 52, which in turn moves the thrust reverse blocker door 68. It is to be understood that the controller 50 may command multiple actuators 46 to move multiple moveable doors 52 and thrust reverse blocker doors 68. The controller 50 and actuator 46 move the movable door 52 from the closed position illustrated in FIG. 3 to the open position illustrated in FIG. 4 to achieve a thrust reversing effect, for example.

As can be appreciated from FIGS. 3 and 4, movement of the movable door 52 selectively opens or closes the gap 64 between the first nozzle section 40*a* and the second nozzle section 40*b*. Thus, in the closed position (FIG. 3), the movable door 52 prevents flow through the gap 64 from the bypass passage 32 and the thrust reverse blocker door 68 is in a stowed position substantially out of the bypass passage 32.

When thrust reversing is desired, such as after landing, the controller 50 and actuator 46 translate the moveable door 52 axially forward to the open position (FIG. 4). Movement of the moveable door 52 pulls the linkage 72 and causes the thrust reverse blocker door 68 to rotate about the pivot 76 to a deployed position such that the free end 72 moves radially outwards from the inner cowl 34 toward the second nozzle section 40*b*. In the illustrated example, the free end 72 may abut against the inner surface 44*b* of the second nozzle section 40*b* and defect the discharge flow D outwards through the gap 64 and vents 60 of the thrust reverse cascade 58 for a thrust reversing effect.

As can be appreciated from the disclosed examples, the example nozzle 30 integrates the functions of controlling the nozzle cross-sectional flow area and thrust reversing. That is, the controller 50 and actuator 46 move the second nozzle section 40*b* and the moveable door 52 to control the nozzle cross-sectional flow area and thrust reversing. Moreover, because movement of the moveable door 52 is independent of movement of the second nozzle section 40*b*, the controller 50 and actuator 46 can control the nozzle cross-sectional area without thrust reversing. Additionally, the disclosed nozzle 30 is compact because the second nozzle section 40*b* does not require additional aft movement to achieve the thrust reversing, which is controlled through separate forward movement of the movable door 52.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine system, comprising:
    a first nozzle section;
    a second nozzle section, wherein the first nozzle section and the second nozzle section at least partially define a gas turbine engine bypass passage, wherein the second nozzle section is axially translatable relative to the first nozzle section such that there is a gap between the first nozzle section and the second nozzle section when the second nozzle section is moved from a first position to a second position; and
    a moveable door at least partially between the first nozzle section and the second nozzle section for selectively opening and closing the gap, wherein the moveable door includes a thrust reverse cascade between a radially inner surface of the moveable door and a radially outer surface of the moveable door relative to an engine centerline, the thrust reverse cascade including tracks to guide the moveable door during axial translation.

2. The gas turbine engine system as recited in claim 1, wherein the gas turbine engine bypass passage includes a radially inner surface and a radially outer surface relative to an engine centerline, and the first nozzle section and the second nozzle section form at least a portion of the radially outer surface.

3. The gas turbine engine system as recited in claim 2, wherein the movable door is located radially outwards of the gas turbine engine bypass passage relative to the engine centerline axis.

4. The gas turbine engine system as recited in claim 1, including a thrust reverse blocker door connected to the moveable door via a linkage.

5. The gas turbine engine as recited in claim 4, wherein the thrust reverse blocker door rotates axially forward in response to movement of the moveable door.

6. The gas turbine engine system as recited in claim 1, wherein thrust reverse cascade includes a plurality of vents.

7. The gas turbine engine system as recited in claim 6, wherein the plurality of vents change the direction of airflow in the gas turbine engine bypass passage.

8. The gas turbine engine system as recited in claim 1, further comprising a seal between the first nozzle section and the second nozzle section in the first position.

9. The gas turbine engine system as recited in claim 1, wherein the moveable door includes an axially forward side attached to the radially inner side of the moveable door and the radially outer side of the moveable door, wherein the axially forward side is connected to an actuator via a linkage.

10. The gas turbine engine system of claim 1, wherein the combustion section and the turbine section define a core airflow passage, wherein the gas turbine fan bypass passage is radially outward of the core airflow passage.

11. The gas turbine engine of claim 10, wherein the core airflow is discharged from the core airflow passage between an inner cowl and a tail cone.

12. The gas turbine engine system of claim 1, wherein the gas turbine fan bypass passage is in fluid communication with the fan.

13. The gas turbine engine system of claim 1, wherein the gas turbine bypass passage bypasses a compressor section, a combustor section, and a turbine section.

14. A gas turbine engine system, comprising:
    a fan;
    a combustion section downstream of the fan;
    a turbine section downstream of the combustion section;
    a fan bypass passage downstream from the fan;
    a nozzle defining at least a portion of the fan bypass passage and having a first nozzle section and a second nozzle section axially translatable relative to the first nozzle section such that there is a gap between the first nozzle section and the second nozzle section when the second nozzle section is moved from a first position to a second position; and
    a moveable door at least partially between the first nozzle section and the second nozzle section for selectively opening and closing the gap, wherein an actuator is attached to the moveable door to move the moveable door independent of the second nozzle section.

15. The gas turbine engine system of claim 14, wherein the actuator is connected to the moveable door and the second nozzle section using a linkage with a plurality of telescopic links.

16. The gas turbine engine system of claim 15, wherein the moveable door includes a thrust reverse cascade between a radially inner surface of the moveable door and a radially outer surface of the moveable door relative to an engine centerline, the thrust reverse cascade including tracks guiding the moveable door during axial translation.

17. The gas turbine engine system as recited in claim 14, further including a thrust reverse blocker door pivotably attached to an inner cowl, wherein the inner cowl defines a radially inner side of the fan bypass passage.

18. The gas turbine engine system as recited in claim 17, wherein the thrust reverse blocker door is attached to the inner cowl on a first end and to a linkage on a second end, wherein the linkage is attached to the moveable door, wherein the thrust reverse blocker door moves in response to movement of the moveable door.

19. The gas turbine engine as recited in claim 17, wherein the thrust reverse blocker door moves in the same axial direction as the moveable door when moving from an closed position to an open position.

20. The gas turbine engine system of claim 17, wherein the thrust reverse blocker door includes a free end and a fixed end.

21. The gas turbine engine system of claim 14, wherein the combustion section and the turbine section define a core airflow passage, wherein the fan bypass passage is radially outward of the core airflow passage.

22. A gas turbine engine system, comprising:
a first nozzle section;
a second nozzle section, wherein the first nozzle section and the second nozzle section at least partially define a gas turbine engine bypass passage, wherein the second nozzle section is axially translatable relative to the first nozzle section such that there is a gap between the first nozzle section and the second nozzle section when the second nozzle section is moved from a first position to a second position; and
a moveable door at least partially between the first nozzle section and the second nozzle section for selectively opening and closing the gap, wherein the moveable door is independently moveable relative to the second nozzle section, wherein the moveable door includes a thrust reverse cascade between a radially inner surface of the moveable door and a radially outer surface of the moveable door relative to an engine centerline, the thrust reverse cascade including tracks guiding the moveable door during axial translation.

23. The gas turbine engine system as recited in claim 22, wherein a first actuator axially translates the second nozzle section and a second actuator axially translates the moveable door.

24. The gas turbine engine system as recited in claim 23, wherein the first actuator axially translates the second nozzle section in an axial direction opposite the axial translation of the second nozzle section during thrust reversing.

25. The gas turbine engine system as recited in claim 24, further including a thrust reverse blocker door for thrust reversing.

26. A gas turbine engine system comprising:
a fan disposed about an engine centerline;
a fan bypass passage downstream from the fan;
a nozzle defining at least a portion of the fan bypass passage and having a first nozzle section and a second nozzle section axially translatable relative to the first nozzle section such that there is a gap between the first nozzle section and the second nozzle section when the second nozzle section is moved from a first position to a second position; and
a moveable door at least partially between the first nozzle section and the second nozzle section for selectively opening and closing the gap, wherein an actuator is attached to the moveable door to move the moveable door independent of the second nozzle section;
a gear train having a reduction ratio of greater than 2.5:1, wherein the gear train drives the fan;
a low pressure compressor disposed about the engine centerline, wherein the fan has a diameter greater than a diameter of the low pressure compressor, the gas turbine engine system having a bypass ratio greater than 10:1;
a high pressure compressor;
a combustion section;
a high pressure turbine that drives the high pressure compressor; and
a low pressure turbine having a pressure ratio greater than 5:1, wherein the low pressure turbine drives the low pressure compressor and the gear train.

27. The gas turbine engine system of claim 26, wherein the fan draws air flow into the fan bypass passage, air flow exits the fan bypass passage at an exhaust having a variable cross-sectional area, wherein thrust generated by the gas turbine engine system varies relative to the variable cross-sectional area of said exhaust.

28. The gas turbine engine system of claim 26, wherein the fan draws air flow into the fan bypass passage, air flow exits the fan bypass passage at an exhaust having a variable cross-sectional area, wherein the pressure ratio across the fan varies relative to the variable cross-sectional area of said exhaust.

\* \* \* \* \*